Patented Mar. 7, 1944

2,343,639

UNITED STATES PATENT OFFICE 2,343,639

WASHING TREATMENT

Joseph N. Borglin, Wilmington, Del., assignor to Hercules Powder Company, Wilmington, Del., a corporation of Delaware No Drawing. Application August 2, 1940, Serial No. 350,117

12 Claims. (Cl. 260—97)

This invention relates to the polymerization of rosin and rosin esters and, more particularly, to an improved method of polymerizing rosin and rosin esters whereby an improved product is obtained.

It has been proposed heretofore to polymerize rosin or rosin esters with a chloride of a metal capable of forming an amphoteric hydroxide. However, the polymerized product contained catalyst both in the free form and in combined form, which may be undesirable for some commercial uses. Now it has been found that in accordance with the present invention, the catalyst may be readily and, if desired, completely removed from the reaction mixture.

This invention has as an object to devise an improved process for the production of polymerized rosin, or polymerized rosin ester.

Another object is to devise a process for the production of an improved polymerized rosin or polymerized rosin ester.

Another object is to devise a process for effectively removing the metal chloride catalyst from the polymerized product.

A further object is to devise an improved process for the production of polymerized rosin or rosin ester substantially free from monomeric constituents and constituents which impart tackiness and low melting point to the polymer.

Other objects will appear hereinafter.

These objects are accomplished in the following invention by washing the reaction mixture comprising the polymer and the metal chloride, either as such or dissolved in a volatile organic solvent, with an aqueous medium selected from the group consisting of water, aqueous solutions of salt which inhibit emulsification, and aqueous acids which form water soluble salts with the metal of the metal chloride.

The process of the present invention, therefore, comprises first effecting polymerization of the rosin or rosin ester with a chloride of a metal capable of forming an amphoteric hydroxide, and then removing the catalyst from the polymerized product by washing. Preferably, the removal is effected by washing first with an aqueous acid which forms a water soluble salt with the metal of the chloride and then with pure water to remove traces of water soluble compounds such as acid or water soluble metal salts of the acid.

The process of the invention may be applied to any form of rosin such as wood rosin, gum rosin, or to the purified rosin acids such as abietic acid, sapinic acid, pimaric acid, etc., or to rosin esters such as ordinary ester gum which is the glycerine ester or to other polyhydric alcohol esters of rosin or abietic acid such as esters of the following polyhydric alcohols: ethylene glycol, diethylene glycol, triethylene glycol, diglycol, sorbitol, mannitol, erythritol, pentaerythritol, etc. Monohydric alcohol esters of rosin or abietic acid may be treated such as the following: methyl, ethyl, propyl, butyl, amyl, cetyl, lauryl, stearyl, phenyl, benzyl, abietyl, hydroabietyl, furfuryl, hydrofurfuryl, etc. Mixtures of rosin ester and rosin may be treated by the present invention. Thus, the rosin ester may be completely esterified or may contain a small amount of unesterified rosin acid.

Preferably, the raw material is dissolved in a suitable inert volatile organic solvent before being subjected to treatment with the polymerizing agent. Examples of such solvents are petroleum ether, gasoline, V. M. & P. naphtha, hydrogenated petroleum naphtha, benzene, toluene, xylenes, cymene, menthanes, cyclohexane, decahydronaphthalene, chlorinated solvents such as carbon tetrachloride, ethylene dichloride, tetrachlorethane, pentachloroethane, propylene dichloride, mono- and poly-chlorinated pentane, dichloroethylene, trichloroethylene, monochlorobenzene, etc. The chlorinated solvents are preferred. The concentration of the solution so prepared may vary between about 10% and about 70% by weight of rosin or rosin ester based on the weight of the solution, and preferably from about 30% to about 40% by weight.

If desired, the rosin or rosin ester may be treated with a polymerizing agent in the absence of a solvent, for example, at a temperature above the melting point of the raw material being polymerized.

As the polymerizing catalyst, any chloride of a metal which forms an amphoteric hydroxide may be used. It is preferred to use such metal chlorides as aluminum chloride or fuming stannic chloride. Instead of these chlorides, other metal chlorides may be used, preferably of a metal in its highest valence state, such as titanium tetrachloride, antimony pentachloride, etc. The amount of catalyst may vary from about 1% to about 50% by weight based on the weight of raw materials to be polymerized, and preferably lies within the range of from about 5% to about 15% by weight. The anhydrous metal chlorides are preferred. Preferably, the reaction is carried out under substantially anhydrous conditions. The polymerization is effected by commingling the rosin or rosin ester with the metal chloride under conditions which bring about a substantial polymerization of the rosin or rosin ester. Either the raw material or the catalyst or both may be dissolved in a suitable solvent. Preferably, the solvent is a mutual solvent for both the raw material and the catalyst under the conditions of the reaction. The treatment is conducted at a suitable temperature and for a period of time sufficient to bring about substantial polymerization of the rosin or rosin ester. For example, the reaction may be conducted at a temperature ranging from about −10° C. to about 150° C. and preferably from about 20° C. to about 80° C. or to the refluxing temperature of the mixture, and for a period of time ranging from about ½ hour to about 150 hours, and preferably from about 10 hours to about 50 hours, the time depending upon the concentration of rosin or rosin ester in the reaction mixture, the particular catalyst used, the proportion of catalyst, temperature employed, and other factors.

Following the reaction, the solution containing the reaction mixture, with or without cooling, is subjected to suitable washing with an aqueous medium to remove the catalyst. This aqueous medium may be water, water containing a small amount of a salt which prevents emulsification of the polymerized rosin or rosin ester, or an aqueous solution of a mineral acid such as hydrochloric, sulfuric, nitric, etc.

Where the polymerizing reaction is conducted with the rosin or rosin ester in the molten state and in the absence of a volatile organic solvent, washing may be effected either upon a solution of the reaction mixture in a suitable organic solvent such as enumerated above, or in the molten state. For example, the molten reaction mixture may be washed under pressure at temperatures between about 100° C. and about 200° C. in order to reduce the viscosity of the polymer.

The catalyst may be removed from the reaction mixture by washing with water at temperatures varying from about 20° C. or less to about 100° C. Using a pressure system, the washing temperature may be increased to as much as 200° C. or more.

Frequently, when washing with water, there is a marked tendency toward emulsification of the polymer being washed. For this purpose dilute aqueous solutions of an electrolyte such as alkali metal chlorides or other halides, alkaline earth halides, alkali borates, alkali phosphates, alkali nitrates, alkali sulfates, alkali acetates, etc., may be employed. The concentration of solute in this washing liquid may range upwardly to about 20 or 30% or even more by weight based on the weight of solution.

In many cases, however, an appreciable proportion of the catalyst combines with the rosin and polymerized rosin or polymerized rosin ester to form metal complexes which are not readily decomposed by means of water washing. In addition, in many cases, small amounts of the complex and the catalyst hydrolyze on contact with water to form water insoluble hydroxides which are often partially combined with the unpolymerized and polymerized rosin or rosin esters. These hydroxides are difficult to remove by means of filtration because of their sticky and often colloidal nature. In addition, their removal often carries along polymerized rosin or rosin ester. It has been found that these disadvantages are overcome by washing the reaction mixture preferably in solution in a volatile solvent with aqueous solution of various acids which are preferably inorganic, for example, hydrochloric acid. Instead of hydrochloric acid, other acids which give water soluble salts of the metal of the chloride such as for example, sulfuric acid, nitric acid, phosphoric acid, etc., may be employed. Apparently, such acids form water soluble salts of the metal and decompose complex hydroxides and molecular complexes of the catalyst with the unpolymerized or polymerized material.

The concentration of aqueous acid may vary from about 5% or less up to 50% or more. Usually, the higher the concentration of acid in the washing liquid, the more readily the complexes are broken. The washing with acid may be carried out at atmospheric pressure or at elevated pressure.

A wide range of conditions are possible in the washing of the catalyst from the reaction mixture. Hot or cold washing liquid may be employed. The temperature of washing may vary from about 20° C. to about 200° C. or more. Countercurrent washing will be found in most cases to improve the washing efficiency. The washing may desirably be conducted at the reflux temperature of the mixture of washing liquid and polymer or polymer solution.

In some cases, a small amount of hydroxide precipitates during the washing, particularly when water or an aqueous solution of a salt which prevents emulsification, is employed. In such case, the properties of the product will be improved if the precipitate is filtered off prior to evaporation of the solvent.

Following washing with an aqueous acid or with an aqueous solution of a salt, it is desirable to wash with water in order to remove water soluble compounds from the polymer, such as a salt formed by reaction with the acid, traces of the acid, or salt used to prevent emulsification.

If desired, the washing may be conducted by subjecting the reaction mixture, either with or without the organic solvent, in admixture with the washing liquid to an elevated temperature above the boiling point of either the solvent or the wash liquid in a closed vessel, thereby increasing the efficiency of the process. In this way, any hydroxides or complexes are preliminarily decomposed. Such procedure may be followed, if desired, by washing under ordinary conditions.

Either the complete process or the washing step may be conducted continuously. For example, a rosin solution may be continuously polymerized with a metal chloride, and the reaction mixture continuously passed from the polymerizing zone upwardly through the washing liquids.

From the foregoing, it will be seen that a preferred procedure is to wash first with an aqueous acid and to follow this with washing with water or water to which an electrolyte has been added. In this way, the metal content of the polymer may be reduced to extremely small figures, and the content of corrosive metal salts may be completely eliminated.

Following the washing procedure outlined above, the polymerized rosin or rosin ester may be recovered from the washed solution by evaporation of the organic solvent therefrom, preferably in vacuo.

An optional procedure which may be advantageously employed involves dissolving the product produced in accordance with the foregoing in a suitable volatile organic solvent and washing the resulting solution first with dilute aqueous acid and then with water followed by evaporation of the solvent to recover the polymerized product.

The polymerized product substantially free from metal chloride obtained in accordance with the foregoing may advantageously be distilled under reduced pressure to remove therefrom unpolymerized material and tack-imparting constituents.

The polymerized product made by this invention is characterized by a melting point increase of from about 5° C. to about 100° C. and in the case of rosin by either an unchanged or somewhat reduced acidity.

Below are given several examples showing typical methods of carrying the principles of the present invention into practice. The melting points were determined by the Hercules drop method.

*Example 1*

To a solution of 250 g. WW gum rosin in 580 g. toluene was added 25 g. of anhydrous stannic chloride with shaking. The solution was refluxed for a period of 7 hours at 115° C., then washed with hot water at about 60° C., the water containing a small amount of sodium chloride to prevent emulsification. Some precipitation occurred during the washing. The precipitate was filtered off, and the solution evaporated in vacuo. A transparent polymerized rosin was recovered having an acid number of 150, a color of H and a drop melting point of 105° C. The original rosin had an acid number of 163 and a drop melting point of 82° C.

*Example 2*

To a solution of 140 g. I wood rosin and 250 g. benzene was added 50 g. pulverized anhydrous zinc chloride. The mixture was agitated at 70° C. for a period of three hours. The benzene solution was decanted from sludge and catalyst, washed with 5% aqueous hydrochloric acid, and then with water, and then was evaporated in vacuo. The transparent polymerized rosin recovered had an acid number of 168, a color of F, a drop melting point of 87° C. The original rosin had an acid number of 163 and a drop melting point of 80° C.

*Example 3*

A solution of 200 g. I wood rosin in 400 g. benzene was agitated with 20 g. anhydrous aluminum chloride for a period of 19 hours at 15–20° C. The reaction mixture was washed with cold and hot water, and the solvent distilled off in vacuo. The product had an acid number of 127 and a melting point of 93.5° C. 100 g. of the product were dissolved in 200 c. c. of benzene, the solution washed with 1100 g. of aqueous 4% hydrochloric, and then with water, and the solvent evaporated as before to yield a product having an acid number of 163.5, a drop melting point of 85° C. The original rosin had an acid number of 163 and a drop melting point of 80° C.

*Example 4*

The same procedure as that set forth in Example 3 was followed except that the reaction period was 35 hours. There was obtained a product having an acid number of 163, a color of H, and a drop melting point of 98° C.

*Example 5*

A solution of 120 g. I wood rosin in 400 g. toluene was agitated with 3 g. anhydrous aluminum chloride for a period of 6 hours at 75° C. after which 500 c. c. of water was added with agitation. The solution of polymer in toluene was separated from the aqueous layer and washed with 2 liters of aqueous 1% hydrochloric acid and then with water. The solvent was evaporated as before to give a product having an acid number of 163, a drop melting point of 88.5° C., and a color of E. The original rosin had a drop melting point of 80° C., and an acid number of 163.

*Example 6*

To 250 g. of ethylene dichloride, there was added 48 g. of anhydrous aluminum chloride. Part of the catalyst dissolved on standing and shaking. To the mixture was added about 50 c. c. of a solution of 600 g. of I wood rosin in 900 g. of ethylene dichloride in order to form catalyst complex. The remainder of the rosin solution was then added with agitation and cooling. The catalyst dissolved and the homogeneous solution was allowed to stand at room temperature for a period of 200 hours. After washing with several liters of aqueous 10% hydrochloric acid, then with water, and evaporating the solvent in vacuo, a transparent polymerized rosin remained having an acid number of 151.5 and a drop melting point of 108° C. This product was redissolved in 500 g. benzene and the solution was washed with 2200 g. of aqueous 10% hydrochloric acid at 45–55° C., then was washed with water, and the solvent evaporated as before to yield a product having an acid number of 159 and a drop melting point of 105° C. The original rosin had an acid number of 163 and a drop melting point of 80° C.

*Example 7*

To a solution of 730 g. of ester gum (glycerol ester of rosin) dissolved in 980 g. benzene, there was added 66 g. of anhydrous stannic chloride dissolved in 100 g. benzene over a period of 5 minutes with agitation at room temperature. The homogeneous reaction mixture was allowed to stand closed at room temperature for 24 hours. After washing with warm, aqueous 10% hydrochloric acid in excess, and then with water, the solvent was evaporated by distillation in vacuo. The product had a drop melting point of 100° C., a color of G+ and an acid number of 10. The original ester gum had a drop melting point of 85° C., a color of K, and an acid number of 7.

*Example 8*

To a solution of 100 g. ester gum dissolved in 400 g. toluol were added 5 g. of anhydrous stannic chloride. The mixture was agitated 3 hours at about 75° C. After cooling, the mixture was water washed and the solvent removed by distillation at reduced pressure. The product had an acid number of 1, a drop melting point of 118.5° C., an iodine number of 199 and a molecular weight of 864. The original ester gum had an acid number of 7.4, a melting point of 104° C., an iodine number of 254, and a molecular weight of 711.

*Example 9*

To a solution of 100 g. of ester gum dissolved in 200 g. of ethylene dichloride was added 40 g. of aluminum chloride (anhydrous) at 50° C. with agitation. The mixture was maintained at a temperature just below the reflux temperature for a period of about 4 hours, with intermittent agitation. The reaction mixture was then cooled and poured into 2.5 liters of a 2% aqueous solution of hydrochloric acid, with agitation. Additional aqueous hydrochloric acid was added to bring the total hydrochloric acid to 50–60 g. of HCl (calculated as 100% strength) and the mixture was then steam distilled to remove the ethylene dichloride. The solid residue was then extracted with benzene and the solution so formed washed with hot aqueous 5% hydrochloric acid solution, and then with water until neutral. The product was then recovered from the benzene solution by evaporating the benzene under reduced pressure. The product had an acid number of 3 and a drop melting point of 121° C. The original ester gum had an acid number of 6 and a drop melting point of 106° C.

From the foregoing, it will be seen that the process of the present invention provides a convenient and economical method for the removal from the reaction mixture of polymerized rosin or rosin ester and the metal halide of the metal chloride so that a product of improved properties, particularly for use in metallic coating formulations is obtained.

The term "water" as used herein is intended to designate substantially pure water, or water free from compounds deleterious in the process, such as distilled water, city or well water of relatively pure character, etc.

It will be understood that the details and examples hereinbefore set forth are illustrative only and that the invention as broadly described and claimed is in no way liimted thereby.

What I claim and desire to protect by Letters Patent is:

1. The process which comprises polymerizing a material selected from the group consisting of rosin and rosin esters by treatment with a chloride of a metal capable of forming an amphoteric hydroxide under conditions which bring about a substantial increase in the melting point of said material, and washing the reaction mixture with an aqueous acid capable of forming a water soluble salt with the metal of said chloride.

2. The process which comprises polymerizing a material selected from the group consisting of rosin and rosin esters by treatment with a chloride of a metal capable of forming an amphoteric hydroxide under conditions which bring about a substantial increase in the melting point of said material, and washing the reaction mixture in solution in a volatile organic solvent with an aqueous acid capable of forming a water soluble salt with the metal of said chloride.

3. The process which comprises polymerizing a material selected from the group consisting of rosin and rosin esters by treatment with a chloride of a metal capable of forming an amphoteric hydroxide under conditions which bring about a substantial increase in the melting point of said material, and washing the reaction mixture in solution in a volatile organic solvent with aqueous hydrochloric acid.

4. The process which comprises polymerizing rosin by treatment with a chloride of a metal capable of forming an amphoteric hydroxide under conditions which bring about a substantial increase in the melting point of said rosin, and washing the reaction mixture with aqueous hydrochloric acid.

5. The process which comprises polymerizing rosin by treatment with aluminum chloride under conditions which bring about a substantial increase in the melting point of said rosin, and washing the reaction mixture in solution in a volatile organic solvent with aqueous hydrochloric acid.

6. The process which comprises polymerizing a material selected from the group consisting of rosin and rosin esters by treatment with a chloride of a metal capable of forming an amphoteric hydroxide under conditions which bring about a substantial increase in the melting point of said material, and washing the reaction mixture with an aqueous acid capable of forming a water soluble salt with the metal of said chloride and then with water.

7. The process which comprises polymerizing a material selected from the group consisting of rosin and rosin esters by treatment with a chloride of a metal capable of forming an amphoteric hydroxide under conditions which bring about a substantial increase in the melting point of said material, washing the reaction mixture with an aqueous acid capable of forming a water soluble salt with the metal of said chloride and thereby substantially removing said chloride and addition products therewith from the polymerized material, and distilling the polymerized material substantially free from said chloride under reduced pressure to remove therefrom unpolymerized material and tack-imparting constituents.

8. The process which comprises washing a polymerization mixture resulting from the polymerization of a material selected from the group consisting of rosin and rosin esters with a chloride of a metal capable of forming an amphoteric hydroxide under conditions which bring about a substantial increase in the melting point of said material with an aqueous acid capable of forming a water soluble salt with the metal of said chloride and thereby substantially removing said metallic chloride from said mixture.

9. The process which comprises washing a solution in a volatile organic solvent of a polymerization mixture resulting from the polymerization of a material selected from the group consisting of rosin and rosin esters with a chloride of metal capable of forming an amphoteric hydroxide under conditions which bring about a substantial increase in the melting point of said material with an aqueous acid capable of forming a water soluble salt with the metal of said chloride and thereby substantially removing said metallic chloride from said mixture, and recovering polymerized material from the washed solution.

10. The process which comprises washing a polymerization mixture resulting from the polymerization of a material selected from the group consisting of rosin and rosin esters with a chloride of a metal capable of forming an amphoteric hydroxide under conditions which bring about a substantial increase in the melting point of said material with an aqueous acid capable of forming a water soluble salt with the metal of said chloride and thereby substantially removing said metallic chloride from said mixture, and distilling the washed residual polymerized material substantially free from said chloride under reduced pressure to remove therefrom unpolymerized material and tack-imparting constituents.

11. The process which comprises polymerizing a material selected from the group consisting of rosin and rosin esters by treatment with a chloride of a metal capable of forming an amphoteric hydroxide under conditions which bring about a substantial increase in the melting point of said material, washing the reaction mixture in solution in a volatile organic solvent with dilute aqueous hydrochloric acid, evaporating the organic solvent from the resulting washed solution, dissolving the polymerized product thus obtained in a volatile organic solvent, washing the resulting solution with dilute aqueous hydrochloric acid, and then with water, and evaporating said second-named organic solvent from the resulting washed solution to thereby recover the polymerized product substantially free from said chloride.

12. In the method of polymerizing rosin by subjecting said rosin to the action of heat and zinc chloride, the step of removing zinc from the polymerized rosin product which comprises washing said product with an aqueous solution of an acid stronger than abietic acid until all of the zinc is dissolved in said solution and recovering the polymerized rosin product.

JOSEPH N. BORGLIN.